May 29, 1928.

J. P. GRUNDON 1,671,717

CLUTCH OPERATING MECHANISM

Filed May 5, 1927      2 Sheets-Sheet 1

Inventor
J. P. GRUNDON
By Earl M. Sinclair
Attorney

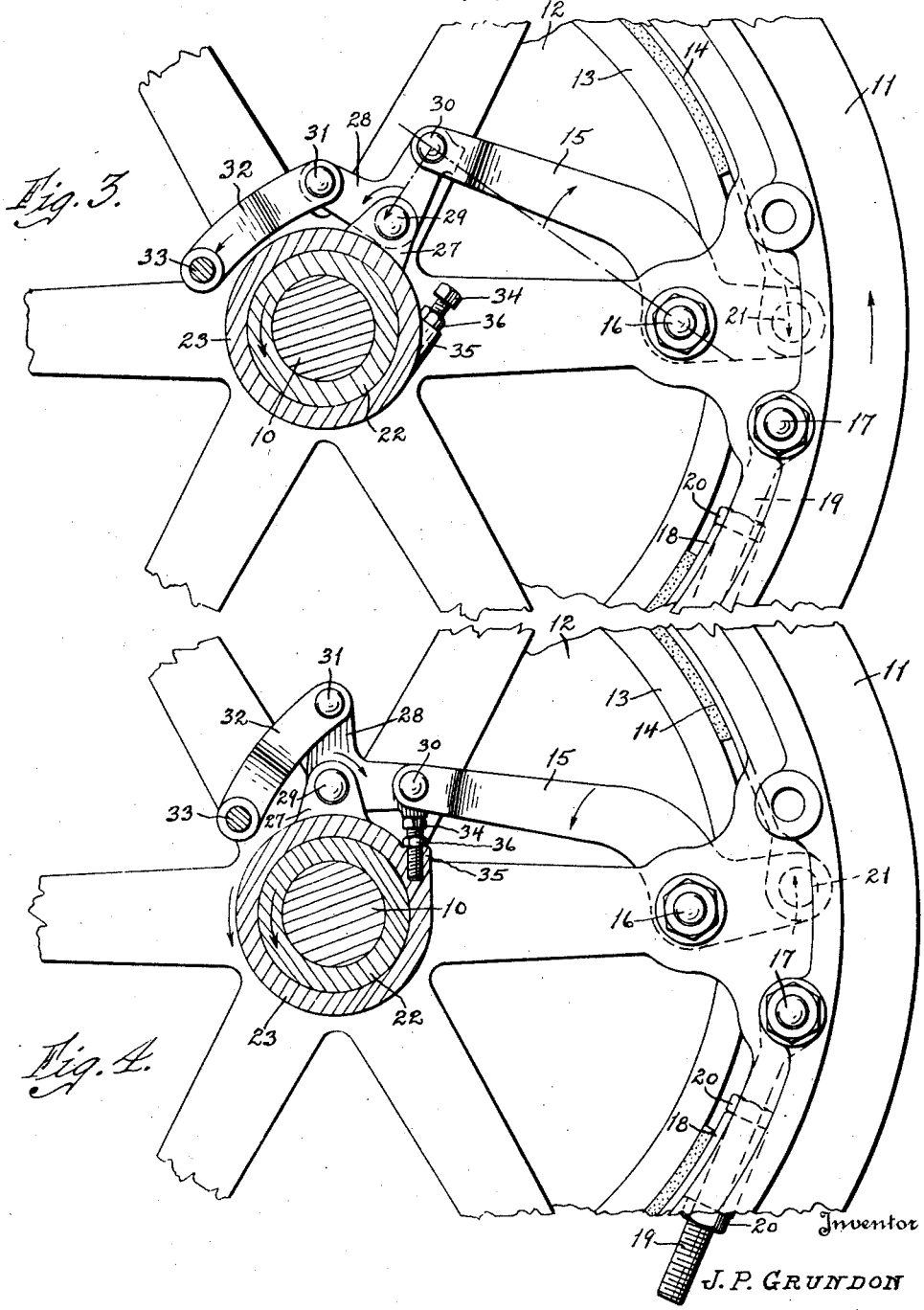

Patented May 29, 1928.

1,671,717

UNITED STATES PATENT OFFICE.

JOHN P. GRUNDON, OF FORT DODGE, IOWA.

CLUTCH-OPERATING MECHANISM.

Application filed May 5, 1927. Serial No. 188,983.

The principal object of this invention is to provide a simple and efficient means for actuating a clutch mechanism.

A further object of the invention is to provide means adapted to be set in motion by actuation of a hand lever for utilizing the momentum of a rotating member for setting or releasing a heavy-duty clutch.

More specifically, the object of this invention is to provide a pair of brake drums mounted side by side and having band brakes thereon adapted for selective manual operation for the purpose of utilizing the momentum of a revolving wheel located adjacent said brake drums for setting or releasing a heavy-duty clutch carried by said revolving wheel and applicable to a member to be driven therefrom.

With these and other objects in view, my invention consists in the construction, arrangement and combination of elements hereinafter set forth, pointed out in the claims an indicated by the accompanying drawings in which:

Fig. 3 is a side elevation partly in section showing portions of the mechanism in the position they occupy when the heavy-duty clutch is set or applied.

Fig. 4 is a view similar to Fig. 3 showing the same parts in the position they occupy when the clutch is released.

Figure 1:
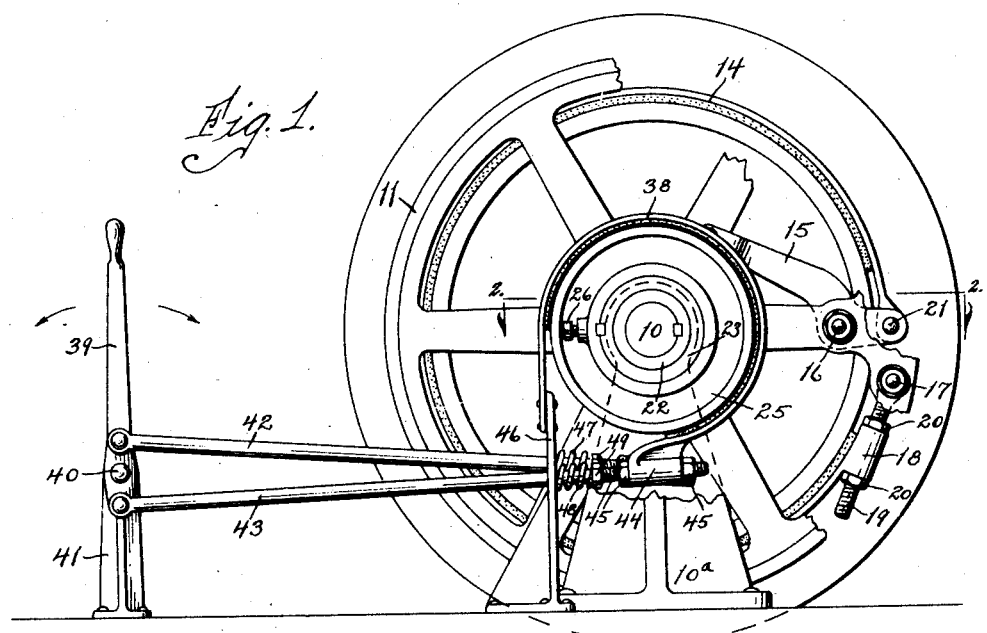
Fig. 1 is a side elevation illustrating the complete mechanism, portions of the driving wheel being broken away for clearness of illustration.
Figure 2:
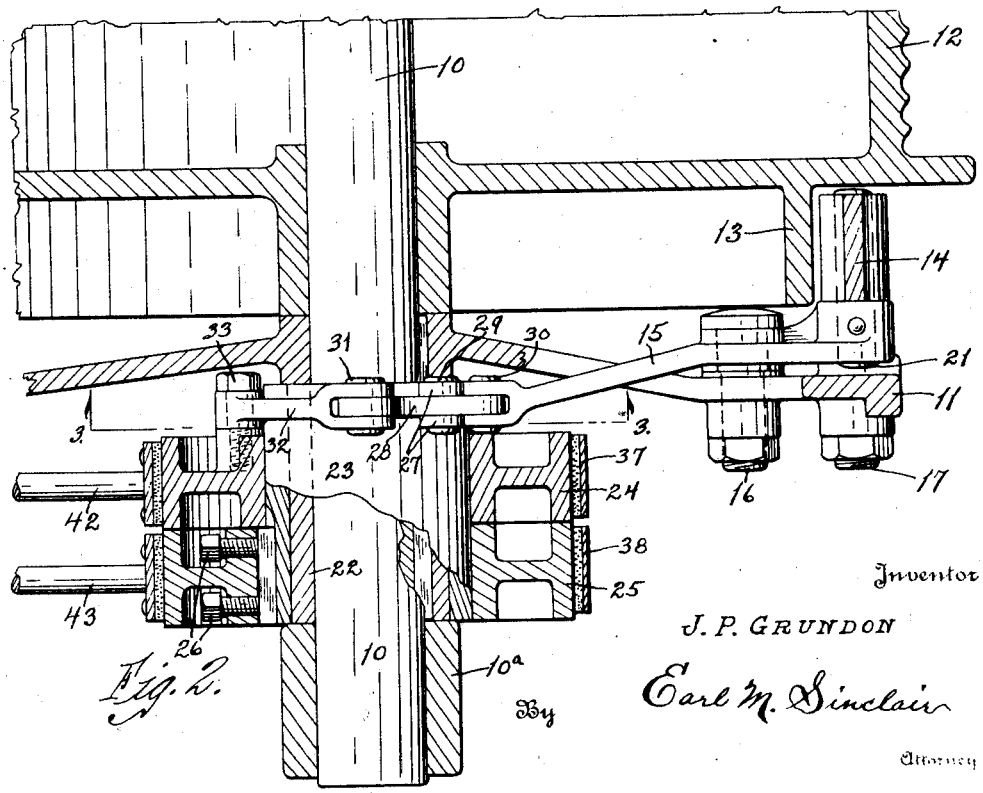
Fig. 2 is a horizontal section of the clutch-operating means on an enlarged scale on the line 2—2 of Fig. 1.

This mechanism is adapted to be applied and employed for the operation of a heavy-duty band clutch such as is commonly employed on excavating machinery and the like for clutching a drum to a driving wheel, the drum being employed to receive a cable which is adapted to be wound thereon. Only such portions of the mechanism are here shown as are necessary to an understanding of my present invention. The principal members of the main mechanism are a shaft 10 suitably mounted for rotation in bearings 10ª, one of which is shown. Fixed to the shaft 10 is a driving wheel 11 which may be a spur gear or any other suitable type of wheel. Loosely mounted on the shaft 10 adjacent to the wheel 11 is a drum or reel 12 which is adapted for rotation with said wheel at times and as here shown, is adapted to receive a cable or the like. The drum or reel 12 is formed with a rim 13 on that side next to the driving wheel 11, which rim is encircled by a band clutch member 14 of common form. A clutch-operating lever 15 is pivoted between its ends by a bolt 16 which is carried by the wheel 11. As here shown, the bolt 16 is carried by a spoke of the wheel 11 at a point adjacent its periphery and the lever 15 is bent so as to pass from one side to the other of the wheel 11 between the spokes thereof. One point of the clutch band 14 is pivotally secured to the wheel 11 by means of a stud or bolt 17 which is located adjacent the outer end of the spoke which carries the fulcrum bolt 16 of the clutch-operating lever. The band clutch is provided with a suitable adjusting means which includes an eye 18 slidably mounted on a threaded bolt 19 which is pivoted on the stud or pin 17, the eye being confined between nuts 20 adjustably mounted on said bolt. The oposite end of the clutch band is pivotally secured by a bolt or the like 21 carried by the short end of the clutch-operating lever 15. When the lever 15 is actuated to carry the movable end of the clutch band toward the relatively fixed end which is connected by the bolt 17, the clutch is set or tightened relative to the rim 13 and the drum 12 is caused thereby to revolve with the driving wheel 11 and the shaft 10. When the lever 15 is moved so as to carry the point 21 away from the point 17 the clutch is released and the drum 12 is stopped from rotation. Any suitable braking means may be employed if desired for causing immediate stoppage of the drum 12 when the clutch is released.

Loosely mounted on the hub 22 of the driving wheel 11, on the side opposite to the reel 12, is a sleeve 23. Mounted side by side on the sleeve 23 are twin drums 24 and 25. The drum 24 is loose on the sleeve 23 but the drum 25 is keyed thereto in any suitable way as by the use of screws 26. At its inner end the sleeve 23 is provided with spaced apertured ears 27 between which a bell-crank lever 28 is pivotally mounted by means of a bolt or the like 29. The long arm of the clutch-operating lever 15 is forked and is pivotally secured by a bolt or rivet 30 to one arm of the bell-crank 28. The other arm of the bell-crank is pivoted by a bolt or rivet 31 to one end portion of a link 32 which has its opposite end pivotally attached by means of a cap screw 33 to the innermost drum 24. An adjusting screw 34 is threaded into a boss 35 formed on the inner end of the sleeve 23 and is adapted to serve as a stop to limit movement of the bell-crank lever 28 and clutch-operating lever 15 in one direction. The adjusting screw 34 may be provided with a lock nut 36 to hold it in adjusted position.

Suitable brake bands 37 and 38 are mounted on the drums 24 and 25 respectively and are adapted for selective operation. The means for manually operating the brake bands 37 and 38 is shown in Fig. 1 and includes a hand lever 39 fulcrumed at 40 on a bracket or standard 41. Operating rods 42 and 43 are pivotally connected at one end each to the lever 39 and on opposite sides of the fulcrum 40 thereof. The operating rod 43 extends through an eye 44 formed on one end of the brake band 38 and the rod 42 extends through a similar eye (not shown), formed on the brake band 37. The rods 42 and 43 are threaded at their ends and provided with adjusting nuts 45 on opposite sides of the eyes 44 by means of which the brake bands may be adjusted. The opposite ends of the brake bands 37 and 38 are rigidly attached to a frame member 46. Cushioning spring 47 and 48 preferably are mounted on the rods 42 and 43 respectively, said springs engaging with the frame member 46 and at the other end with adjusting nuts 49 threaded on the respective rods.

When it is desired to apply the clutch band 14 to the rim 13 so as to cause rotation of the reel 12 with the driving wheel 11, the hand lever 39 is manually moved to the right as seen in Fig. 1, thus causing a pull on the lower connecting rod 43 and tightening the brake band 38 on the drum 25. As the drum 25 is fixed to the sleeve 23, this action causes a stoppage of the sleeve 23 which is rotating with the wheel 11, the direction of rotation being indicated by the arrows in Figs. 3 and 4. A limited reverse movement of the sleeve 23 relative to the rotating wheel is thus caused, which has the effect of throwing fulcrum 29 of the bell-crank 28 to the right as viewed in Fig. 4, thereby causing an oscillation of said bell-crank to the position shown in Fig. 3 and a consequent oscillation of the clutch-operating lever 15. This oscillation of the lever 15 carries the movable pivot 21 of the clutch band 14 toward the fixed pivot 17 thereof, thereby effecting a tightening of the band on the rim 13. As the members to which the clutch band 14 are attached are carried by the rotating wheel 11, this action has the result of clutching the reel 12 to said wheel and causing a conjunctive rotation thereof. It should also be noted that the movement of the bell-crank lever 28 from the position shown in Fig. 4 to the position shown in Fig. 3 above referred to, will also result, through its connection to the link 32, in a limited forward movement of the innermost drum 24, said link being pivoted to said drum 24 by the screw 33.

When it is desired to release the clutch band 14 from the reel, the hand lever 39 is moved in the opposite direction past its neutral position as indicated in Fig. 1, which results in a pull on the rod 42 and at the same time a push on the rod 43. This releases the brake band 38 from the outermost drum 25 and applies the brake band 37 to the innermost drum 24. This application of the brake to the innermost drum 24 causes a momentary stoppage of its rotation with the other moving parts and a limited reverse movement which results in carrying the parts from the position shown in Fig. 3 to that shown in Fig. 4 by a rearward thrust on the link 32. This thrust results in an oscillation of the bell-crank lever 28 and a consequent forward movement of its pivot 29 and with it the sleeve 23, the oscillation of the bell-crank resulting in an oscillation of the clutch-operating lever 15 which carries the movable pivot 21 of the clutch band 14 away from the fixed pivot 17 thereof and releases the clutch band from the reel 12.

This mechanism provides a very simple and easy method of operating the clutch mechanism for the purpose of applying or releasing the clutch band relative to the drum 12, the momentum of the driving wheel 11 being employed to operate the clutch lever 15 in each instance. A very small amount of force is required to operate the hand lever 39 which is very nicely balanced by the springs 47 and 48 and very little force is necessary to apply the brake bands 37 and 38 and cause the limited reverse movement of the drums 24 and 25 for releasing and applying the clutch respectively.

When the members move to position for applying the clutch as shown in Fig. 3, the reverse movement of the sleeve 23 is sufficient to carry the pivot 29 of the bell-crank past the center of the pivot 30 between said bell-crank and the clutch-operating lever 15 whereby the parts tend to remain in such position until purposely moved therefrom.

I claim as my invention:

1. The combination with a wheel mounted for rotation, a driven member designed to be clutched thereto, a clutch band adapted for engagement with said driven member, a clutch-operating lever fulcrumed on said wheel and having one end engaging the movable end of said clutch band; of a clutch-operating mechanism comprising a sleeve loosely engaging the hub of said wheel and capable of a limited rotary movement in both directions relative thereto, a pair of drums mounted on said sleeve, one of said drums being fast and the other being loose on said sleeve, brake bands engaging said drums, manually operated means for selectively applying the bands to said drums, a pivotal connecting means between said sleeve and the clutch-operating lever for tightening the clutch band on said driven member when said sleeve is turned in one direction relative to the wheel through the instrumentality of the drum which is fast on said sleeve, and a connecting means between the first mentioned connecting means and the drum which is loose on said sleeve for releasing said clutch band by causing the sleeve to be turned in the opposite direction relative to the wheel.

2. The combination with a wheel mounted for rotation, a driven member designed to be clutched thereto, a clutch band adapted for engagement with said driven member, a clutch-operating lever fulcrumed on said wheel and having one end engaging the movable end of said clutch band; of a clutch-operating mechanism comprising a sleeve loosely engaging the hub of said wheel, a pair of drums mounted side by side on said sleeve, one of said drums being fast and the other being loose on said sleeve, brake bands engaging said drums, manually operated means for selectively applying the bands to said drums, a bell-crank lever pivoted on said sleeve and pivotally connected at one end to the clutch-operating lever, and a pivotal connection between the other arm of said bell-crank lever and the drum which is loose on said sleeve.

3. The combination with a wheel mounted for rotation, a driven member designed to be clutched thereto, a clutch band adapted for engagement with said driven member, a clutch-operating lever fulcrumed on said wheel and having one end engaging the movable end of said clutch band; of a clutch-operating mechanism comprising a sleeve loosely engaging the hub of said wheel, a bell-crank lever pivoted on said sleeve and pivotally connected at one end to the clutch-operating lever, manually operated means for causing a limited reverse movement of said sleeve to oscillate the bell-crank lever and clutch-operating lever for tightening said clutch band, and manually operated means for causing a limited relative forward movement of said sleeve to oscillate said bell-crank lever and clutch-operating lever in the opposite direction for releasing said clutch band.

4. The combination with a wheel mounted for rotation, a driven member designed to be clutched thereto, a clutch band adapted for engagement with said driven member, a clutch-operating lever fulcrumed on said wheel and having one end engaging the movable end of said clutch band; of a clutch-operating mechanism comprising a sleeve loosely engaging the hub of said wheel, a bell-crank lever pivoted on said sleeve and pivotally connected at one end to the clutch-operating lever, manually operated means for causing a limited reverse movement of said sleeve to oscillate the bell-crank lever and clutch-operating lever for tightening said clutch band, adjustable means for limiting movement of said bell-crank lever and clutch-operating lever in one direction, and manually operated means for causing a limited relative forward movement of said sleeve to oscillate said bell-crank lever and clutch-operating lever in the opposite direction for releasing said clutch band.

5. The combination with a wheel mounted for rotation, a driven member designed to be clutched thereto, a clutch band adapted for engagement with said driven member, a clutch-operating lever fulcrumed on said wheel and having one end engaging the movable end of said clutch band; of a clutch-operating mechanism comprising a sleeve loosely engaging the hub of said wheel, a pair of drums mounted side by side on said sleeve, one of said drums being fast and the other being loose on said sleeve, brake bands engaging said drums, a hand lever, connecting rods pivoted to said hand lever on opposite sides of the fulcrum thereof, connections between the opposite ends of said connecting rods and the respective brake bands, a bell-crank lever pivoted on said sleeve and pivotally connected at one end to the clutch-operating lever and a pivotal connection between the other arm of said bell-crank lever and the drum which is loose on said sleeve.

6. The combination with a wheel mounted for rotation, a driven member designed to be clutched thereto, a clutch band adapted for engagement with said driven member, a clutch-operating lever fulcrumed on said wheel and having one end engaging the movable end of said clutch band; of a clutch-operating mechanism comprising a sleeve loosely engaging the hub of said wheel, a pair of drums mounted side by side on said sleeve, one of said drums being fast and the other being loose on said sleeve, brake bands engaging said drums, manually operated means for selectively applying the bands to said drums, a bell-crank lever pivoted on said sleeve, a link pivotally connecting one arm of said bell-crank lever with the drum which is loose on said sleeve, the other arm of said bell-crank lever having pivotal connection with said clutch-operating lever, and adjustable means for limiting oscillation of said bell-crank lever and clutch-operating lever in one direction.

JOHN P. GRUNDON.